(12) United States Patent
Clark (10) Patent No.: US 11,383,283 B1
(45) Date of Patent: Jul. 12, 2022

(54) TRACKING METALLIC WIRES DURING A WINDING OPERATION

(71) Applicant: Clark Innovative Technologies, LLC, Lebanon, KY (US)

(72) Inventor: Joseph Timothy Clark, Louisville, KY (US)

(73) Assignee: CLARK INNOVATIVE TECHNOLOGIES, LLC, Lebanon, KY (US)

(*) Notice: Subject to any disclaimer, the term of this patent is extended or adjusted under 35 U.S.C. 154(b) by 1050 days.

(21) Appl. No.: 16/007,526

(22) Filed: Jun. 13, 2018

Related U.S. Application Data (60) Provisional application No. 62/520,356, filed on Jun. 15, 2017.

(51) Int. Cl.
*B21C 47/02* (2006.01)
*B21C 51/00* (2006.01)
*G01B 11/04* (2006.01)
*H01F 41/094* (2016.01)
*H01F 41/096* (2016.01)
*H02K 15/04* (2006.01)
*G01D 21/00* (2006.01)

(52) U.S. Cl.
CPC .............. *B21C 47/02* (2013.01); *B21C 51/00* (2013.01); *G01B 11/043* (2013.01); *G01D 21/00* (2013.01); *H01F 41/094* (2016.01); *H01F 41/096* (2016.01); *H02K 15/0435* (2013.01)

(58) Field of Classification Search
None
See application file for complete search history.

(56) References Cited

U.S. PATENT DOCUMENTS

2003/0121424 A1* 7/2003 Doyle ................... B65B 13/28
100/29

* cited by examiner

*Primary Examiner* — Raul J Rios Russo
*Assistant Examiner* — Carl F. R. Tchatchouang
(74) *Attorney, Agent, or Firm* — Middleton Reutlinger (57) ABSTRACT

Methods, apparatus, systems, and computer-readable media are provided for tracking amounts of wires provided to a winding head during a winding operation of a wire distribution system. The wires can be tracked using one or more wire tracking devices that can be disposed at one or more locations within the wire distribution system. The wire tracking devices can provide information related to the amounts of wires and the types of wires being used to wind about a winding head/form. The information can be used to check for errors during a winding operation and indicate the progress of the winding operation. The information can also be used to update wire-availability data to reflect the amount of wire that has been provided during the winding operation.

20 Claims, 6 Drawing Sheets

TRACKING METALLIC WIRES DURING A WINDING OPERATION

BACKGROUND

Industrial material management can inherently present a variety of obstacles associated with tracking usage of a variety of materials. In many repair facilities, one may not be able to adequately measure an amount of wire that has been used for a winding. Specifically, because of the small scale of many wires and the arrangement of certain winding systems, estimates of the amounts of wire used for a particular winding can be incorrect as a result of various computational errors. Furthermore, in certain winding systems that generate windings, wires that are left connected between a completed winding and supply containers may be neglected. As a result, certain wire tracking tools may exhibit errors in data that compound over time.

SUMMARY

The present disclosure is generally directed to methods, apparatus, and computer-readable media (transitory and non-transitory) for tracking amounts of wires supplied to a winding during a winding operation of a wire distribution system. A winding can require different gauges of wire, with each gauge having its own specific weight that contributes to an overall weight of the winding. An inventory management system can be used to track an amount of each gauge of wire that is provided to the winding. However, certain inventory managements systems can neglect to account for certain segments of wire that may be left within a wire distribution system after a winding has been completely wound. An inventory management system that relies on differences in weights of wire containers before and after a winding is wound can be unreliable, for example, when such segments of wire are unaccounted for.

Various embodiments set forth herein relate to an inventory management system for wire that relies on a wire tracking device, disposed at one or more locations within a wire distribution system, to accurately measure wire supply. The wire tracking device can include an electrical device, mechanical device, electromechanical device, and/or any other apparatus suitable for tracking an amount of wire being distributed by a wire source. For example, in some implementations, the wire tracking device can include one or more wheels that can be arranged to abut one or more wires as the wires are being distributed from a wire source. The motion of a wire can cause a pulley and/or wheel of the wire tracking device to rotate, and rotation of the pulley and/or wheel can be tracked in order to determine a length of wire that has passed by the wire tracking device. Alternatively, the wire tracking device can include a sensor, such as an optical sensor, that can provide a time-varying signal based on changes in light reflected from the wire. As the wire passes by the sensor, the time-varying signal can indicate an amount of wire that has passed by the sensor, and the time-varying signal can be converted to a length value for determining a total amount of wire that has been supplied to a winding.

The wire distribution system can include multiple stages. A wire supply source of the wire distribution system can include one or more wire containers (e.g., pails, reels, spools, boxes and/or any other mechanism suitable for containing wire) that can be supported by a wire stand (e.g., any holding mechanism suitable for supporting a wire container). In some embodiments, the wire supply source can include multiple wire containers (e.g., at least 5 containers, at least 10 containers, at least 15 containers), and a wire container of the wire containers can include a different size wire (e.g., different gauge) from another wire container in the wire containers. In additional or alternative embodiments, a wire container of the wire containers can additionally or alternatively include a different shape wire (e.g., square, polygonal, circular, oval, etc.) than another wire container in the wire containers. In yet additional or alternative embodiments, a wire container of the wire containers can additionally or alternatively include a wire material (e.g., metal, alloy, etc.) that is different than another wire material in another wire container. In some of these various embodiments, each of the wire containers includes wire that has characteristic(s) (e.g., size, shape and/or material) that are unique from the characteristic(s) of the other wire containers. In other words, the wire containers supported by the wire stand can be heterogeneous.

Another stage of the wire distribution system can include a wire tensioner. The wire tensioner can ensure that an amount of tension suitable for a winding is provided to the wire as the wire is being wound. In some embodiments, the wire tensioner can include a pulley that receives the wire as the wire is being provided to the winding. The wire distribution system can further include a winding machine that includes one or more winding heads. The winding machine can be a programmable device that can receive an input corresponding to a type of winding to be wound by the winding machine, and autonomously wind the winding based on the received input. However, in some embodiments, the winding machine can be non-autonomous. For example, the winding machine can be one that winds (or not) dependent on control input provided by an operator. For instance, the winding machine can wind wire in response to an operator engaging one or more mechanical controls (e.g., a pedal).

The wire distribution system can further include a control management system (CMS), which can receive signals corresponding to the amount of each type of wire that has been provided to one or more windings by the wire distribution system. The CMS can process the received signals and convert the signals into values (e.g., length, weight, volume, etc.), which can be used to quantify the amount of wire provided to a winding. In order to process such signals, the CMS can include memory that stores data related to each type of wire being provided to the winding. Such data can identify shape, diameters, areas, weight per unit length, length per unit of weight, resistance per length, resistance per pound, and/or any other properties related to a wire. Once a winding is completed, the data can be used to determine a total amount of wire that was used to produce the winding. A value for the total amount of wire can be transmitted to an inventory management system, which can automatically update an inventory associated with one or more wires used to produce the winding. The inventory management system can also automatically generate billing information according to the total amount of wire used to produce the winding, automatically order additional wire according to amount(s) of wire(s) used to produce the winding, and/or perform other electronic operation(s) based on the amount(s) of wire(s) used to produce the winding.

In order to provide more accurate data to the inventory management system, the wire tracking device can be included at one or more locations in the wire distribution system and communicate wire data to the CMS. In some embodiments, the wire tracking device can be connected to the tensioning device in order to track a length of wire that is passing through the tensioning device. Alternatively, the wire tracking device can be connected between the tensioning device and the winding machine, and/or connected to the winding machine.

Using the data provided by the wire tracking device, a location of the wire tracking device relative to the winding, and/or other values, a total amount of wire and/or an amount for each of multiple wires can be calculated for a particular winding. In some embodiments, multiple different types of wires can be tracked as they pass into one or more windings. In this way, the inventory management system can receive real-time updates about the types of wires that are being used by the wire distribution system. In response, the inventory management system can more readily restock wire sources that may become depleted as a result of winding operations.

In some implementations, a method is set forth for tracking an amount of metallic wire used during a winding operation. The method can include a step of receiving, at an interface of a computing device, a selection of metallic wire specifications for a winding operation to be performed by a wire distribution system. The wire distribution system can include wire containers for simultaneously supplying different types of metallic wires for the winding operation. The method can further include a step of causing the winding operation to initialize. The winding operation can include winding the different types of metallic wires about a winding head/form that is connected to a winding machine that receives the different types of metallic wires from the wire containers. The method can further include causing one or more wire tracking devices of the wire distribution system to provide feedback based on a motion of the metallic wires through the wire distribution system during the winding operation. Additionally, the method can include determining, based on the feedback, an amount of the metallic wires wound around the winding head/form during the winding operation. The amount can be a length, weight, or any other metric that can quantify an amount of wire. The amount of the metallic wires wound used for the winding can be compared to an estimated amount for the winding operation. When the amount of the metallic wires is outside of a threshold estimated amount for the winding, an error can be generated. The error can be presented at the interface to put the operator on notice that the winding includes more or less metallic wire than estimated. In some implementations, the estimated amount can be based on one or more sensors configured to measure individual amounts of the wire in the wire containers. In some implementations, the estimated amount (or other estimated value) can be based on a predefined amount (or other predefined value) for the type of winding being wound. The predefined amount (or other predefined value) can optionally be based on determined values, from previous winding operations, where the determined values are determined utilizing techniques described herein (e.g., based on signals from a wire tracking device in the prior windings.

In some implementations, a method performed by one or more processors is set forth as including steps such as determining a first length value of a portion of a metallic wire. The portion of the metallic wire can be located between a wire container, for dispensing the metallic wire in a wire distribution system, and a winding head of a winding machine for creating a winding. Additionally, the portion of the metallic wire can be previously extracted from the wire container as a result of being pulled from the wire container during winding of a previous winding wound by the winding machine. The steps can further include receiving, from a wire tracking device of the wire distribution system, a signal in response to the metallic wire being pulled by the winding machine when creating the winding. The wire tracking device can provide the signal based on the metallic wire moving within a responsive distance of the wire tracking device. The steps can also include determining, based on the signal, a second length value of the metallic wire. The second length value of the metallic wire can correspond to an amount of wire used by the winding machine to create the winding. Furthermore, the steps can include determining a combined measure of the metallic wire used by the winding machine to create the winding. The determination of the combined measure of the metallic wire can be based on both the first length value and the second length value. The steps can also include modifying, at a storage device storing data related to the wire distribution system, a stored value associated with the at least one wire container dispensing the metallic wire. The stored value can be modified according to the determined combined measure of the metallic wire.

In some implementations, the winding machine can be operable to wind the metallic wire to create the winding for an electronic device. The wire distribution system can include a wire tensioner that is operable to apply an amount of tension on the wire tensioner, and the wire tracking device can be attached to the tensioner. The wire tracking device can include a pulley that is connected to the winding machine. The data stored by the storage device can include additional values associated with different wire containers that are in addition to the wire container. The different wire containers can include at least a first different wire container that dispenses a different metallic wire that is of a different type than the metallic wire dispensed by the wire container.

In some implementations, the signal can be received from the wire tracking device simultaneous to the winding of the metallic wire. The wire tracking device can include one or more sensors operable to provide the signal in response to the metallic wire being pulled by the winding machine.

In other implementations, a method performed by one or more processors is set forth as including steps such as receiving, at an interface of a computing device, a selection of metallic wire specifications for a winding operation to be performed by a wire distribution system. The wire distribution system can include wire containers for simultaneously providing different types of metallic wires for the winding operation. The steps can also include causing the winding operation to initialize. The winding operation can include winding the different types of metallic wires about a winding head that is connected to a winding machine that receives the different types of metallic wires from the wire containers. The steps can further include causing one or more wire tracking devices of the wire distribution system to provide feedback based on a motion of the different types of metallic wires through the wire distribution system during the winding operation. The steps can also include determining, based on the feedback, that at least one metallic wire, of the different types of metallic wires, is not identified in the metallic wire specifications selected at the interface of the computing device, and providing an indication that the at least one metallic wire is not identified in the metallic wire specifications.

In some implementations, the steps can include identifying, based on the feedback, one or more types of the different types of metallic wires moving through the wire distribution system during the winding operation. The determination that at least one metallic wire is not identified in the wire specifications can include comparing the one or more identified types to the wire specifications selected at the interface of the computing device. In some implementations, a first metallic wire of the different types of metallic wires corresponds to a gauge that is different than a second metallic wire of the different types of metallic wires.

In some implementations, the steps can include accessing a storage device that stores wire-availability data associated with each of the wire containers, and causing the interface to display at least a portion of the wire-availability data.

In yet other implementations, a method implemented by one or more processors is set forth as including steps such as receiving, at an interface of a computing device, a selection of metallic wire specifications for a winding operation to be performed by a wire distribution system. The wire distribution system can include wire containers for simultaneously providing different types of metallic wires for the winding operation. The steps can further include causing the winding operation to initialize. The winding operation can include winding the different types of metallic wires about a winding head that is connected to a winding machine that receives the different types of metallic wires from the wire containers. The steps can also include causing one or more wire tracking devices of the wire distribution system to provide feedback based on a motion of the metallic wires through the wire distribution system during the winding operation. The steps can further include determining, based on the feedback, an amount of each wire of the metallic wires used during the winding operation, and modifying wire-related data to exhibit a reduction in available metallic wires according to the determined amount of each metallic wire of the metallic wires used during the winding operation. Furthermore, the steps can include modifying wire-related data to include a value for the metallic wires used during the winding operation.

In some implementations, the metallic wire specifications can correspond to a previous winding operation performed by the wire distribution system. The computing device can be configured to access historical project data and cause the interface to display metallic wire specifications associated with previous winding operations.

In some implementations, modifying the customer account data can include determining a value per unit for each metallic wire of the metallic wires used during the winding operation. The wire distribution system can include multiple wire tracking devices, and each wire tracking device is configured to monitor a metallic wire of the different types of metallic wires. The determination of the amount of each wire of the metallic wires used during the winding operation can be further based on an amount of pre-existing wire in the wire distribution system from a previous winding operation.

In some implementations, the different types of metallic wires can include different materials of wire. In other implementations, the one or more tracking devices can be attached to the winding machine.

DETAILED DESCRIPTION OF THE INVENTION

Figure 1:
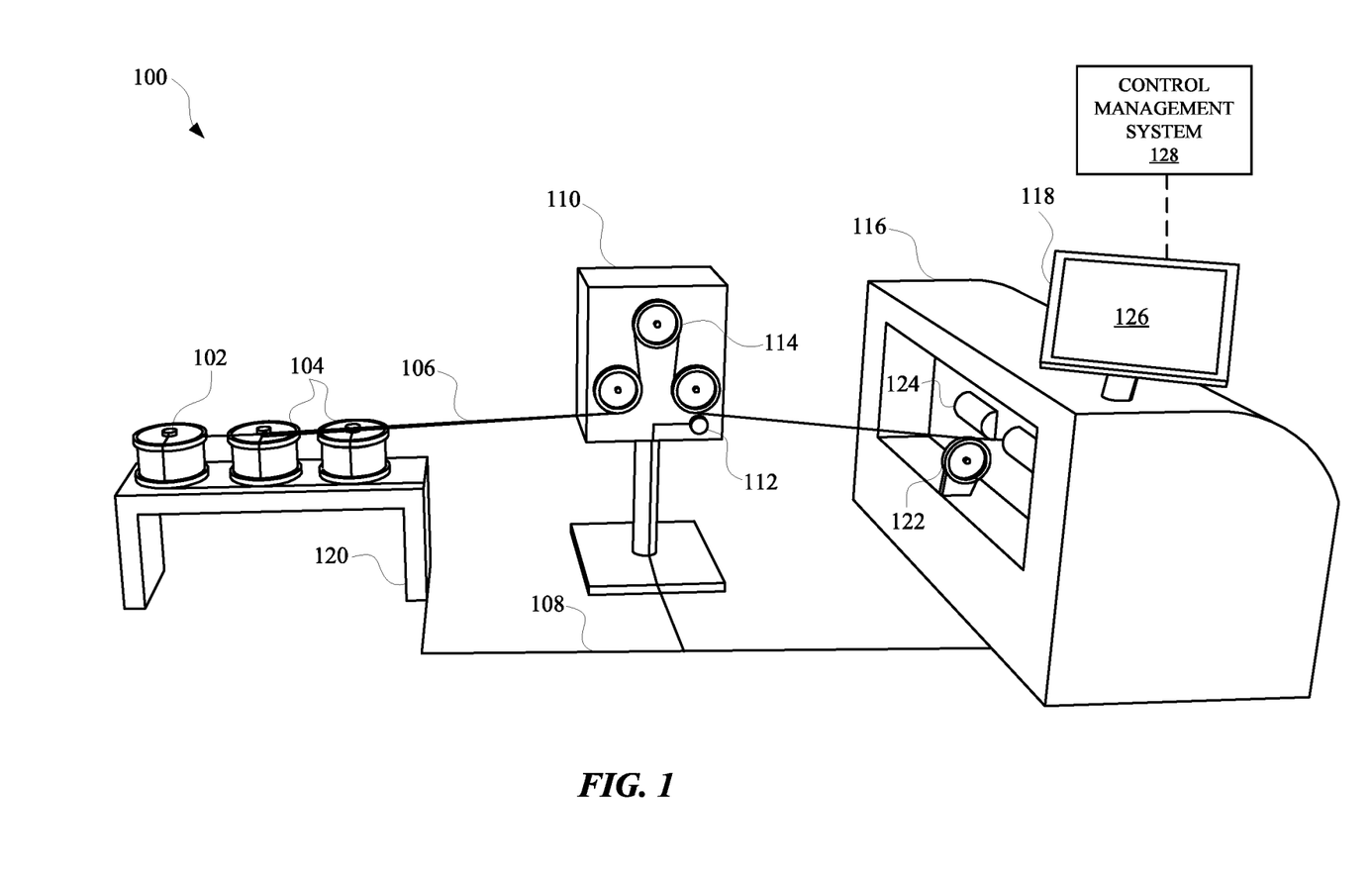
FIG. 1 illustrates a perspective view of a wire distribution system that includes one or more wire tracking devices.

FIG. 1 illustrates a perspective view 100 of a wire distribution system 100 that includes one or more wire tracking devices. The wire distribution system 100 can include one or more wire containers 104 that can supply different types of wire to a winding machine 116. The wire containers 104 can include different types of wire 106, such as different gauges, different shapes, different materials, or other different wire properties. Each of the wire containers 104 can be supported by a wire stand 120 that can support multiple wire containers 104 while the wire containers 104 are providing wire 106 to the winding machine 116. In some implementations, a wire tracking device 102 can be coupled to the wire stand 120 and/or one or more wire containers 104. The wire tracking device 102 can provide a time-varying signal that indicates an amount of wire 106 that has been removed from one or more wire containers 104.

The wire tracking device 102 can measure an amount of wire moving from the wire containers 104 using an electrical device, a mechanical device, and/or an electromechanical device. In some implementations, the wire tracking device 102 can include one or more wheels or pulleys that can abut the wire 106 as the wire 106 is being pulled out of each wire container 104. The pulleys can be attached to an electrical device, such as a tachometer, that can convert the motion of the pulleys into a time varying electrical signal. In other implementations, the wire tracking device can include one or more sensors, such as an optical sensor or encoder, that can sense an amount of wire 106 moving past the wire tracking device 102. For example, when the wire tracking device includes an optical sensor, the optical sensor can provide a time-varying signal based on an amount of light that is reflected from one or more wires passing by the optical sensor. The time-varying signal can be transmitted (e.g., wirelessly or through a cable 108) to a computing device 118, which can include or access a control management system (CMS) 128. The CMS 128 can be a local application at the computing device 118 or remote application that is accessible to the computing device 118 over a network. In some implementations, the CMS 128 can be a device that includes one or more processors, or a microcontroller, which can receive signals from the wire tracking device and/or communicate with the winding machine 116. The CMS 128 can use the signals from the wire tracking device to monitor a progress of a winding operation, track available wire inventory, order replacement wire, initialize winding operations, pause or stop winding operations, and/or any other function for a wire distribution system. In some implementations, the computing device 118 can be part of the wire tracking device and/or include the CMS 128 for providing the operator with a real-time progress report of a winding operation at the winding distribution system.

The wire distribution system can include a tensioner 110 that can include one or more pulleys 114 for ensuring that a threshold amount of tension is exhibited by the wires 106 that are passing through the tensioner 110 to the winding machine 116. In some implementations, the tensioner 110 can include a wire tracking device 112 that can measure an amount of wire that is being provided from the wire containers 104 to the winding machine 116. The wire tracking device 112 can be a pulley, sensor, or any other device suitable for measuring an amount of wire that is in motion. The wire tracking device 112 can be connected to the winding machine 116 wirelessly or through the cable 108 in order to provide data to the winding machine 116 regarding how much wire 106 is being used for a particular winding.

In yet other implementations, a wire tracking device 122 can be connected to the winding machine 116 for tracking an amount of wire that is entering the winding machine 116. In some implementations, the wire tracking device 122 can include a pulley that can receive one or more wires 106 from the tensioner 110 or the wire containers 104. The wire tracking device 122 can further include a device, such as a tachometer, that can convert mechanical motion of the pulley into a time-varying electrical signal. The time-varying electrical signal can be provided to the CMS 128. The CMS 128 can use the time-varying signal to determine how much wire was provided to the winding machine 116 during a winding operation. In other implementations, the wire tracking device 122 can be a sensor device that can measure an amount of wire that is entering the winding machine 116.

The winding machine 116 can include one or more winding heads 124 for controlling how the wire 106 is being wound for a particular winding (e.g., for an iron core of an electric motor, transformer, field coil, solenoid, choke, magnet, starter coil, etc.). The coil can include one or more different types of wires that can be simultaneously provided to the winding machine 116 from the wire containers 104 during a winding operation. The different types of wire 106 can include different materials of wire, different shapes of wire, different gauges of wire, different resistivity of wire, and/or any other distinguishing feature of wire. In some implementations, the wire tracking device 102, 112, and/or 122 can distinguish between types of wires 106 moving into the winding machine 116. For example, when the wire tracking device includes an optical sensor, the optical sensor can use light reflected from the wires 106 to generate signals, from which size, quantity, shape, gauge, and/or material of the wires 106 can be determined. Alternatively, the wire tracking device can include any other electrical sensor that can measure each of the wires 106 to determine their size, quantity, shape, gauge, resistivity, and/or any other features of the wires 106. Data related to the types of wires 106 can be provided from one or more of the wire tracking devices to the winding machine 116 and/or the CMS 128 in order that the winding machine 116 and/or the CMS 128 can track how much of each type of wire was used during a winding operation.

In some implementations, winding operations performed by the winding machine 116 can be initialized by a human operator that enters information into an interface 126 of the computing device 118 for specifying parameters for a particular winding operation. During the winding operation, the wire tracking device can provide feedback to the CMS 128 corresponding to any errors identified during the winding process. For example, an operator can specify that a winding head inside the winding machine 116 should be wound with 5 wire strands, where 2 of the strands are 18 gauge wire and 3 of the strands are 16 gauge wire. If, during the winding process, the wire tracking device indicates that one of the strands is less than 16 gauge wire, the CMS 128 can provide an error message to the operator via the interface 126. The error message can indicate to the operator that the wire 106 being provided to the winding machine 116 during the winding operation does not correspond to the wire types specified by the operator at the interface 126 (e.g., "The wires in the winding machine do not match the selected specifications.").

In some implementations, the CMS 128 can store or access historical data that includes information related to previous winding projects. In this way, if a previous winding project is to be repeated at a later time, the operator can reload the specifications for the previous winding project. This saves the operator time when preparing a winding project, and ensures that there will be no incorrect inputs caused by operator error. Furthermore, the information related to the previous winding projects can also include data such as completion times, amount of each wire used for each project, winding head sizes, cost of winding project, and/or any other data that can be associated with a wire winding project. The CMS 128 can compare projects to determine how similar projects compared from, for example, a cost or supplies perspective in order to identify how to make subsequent winding projects more efficient.

In some implementations, data related to a winding project can be provided from the CMS 128 directly or indirectly to a customer in real-time. In this way, a customer will be able to reliably see the progress of their order. In yet other implementations, the data related to a winding project can be used to update an inventory management system. For example, a winding project can use a specific type of wire (e.g., 18 gauge aluminum wire) and the amount of wire used during the winding project can be monitored by the wire tracking device and shared with an inventory management system. The inventory management system can update, in real-time, an amount of the wire that is available. When the wire supply reaches a particular threshold supply level, the wire can be automatically re-ordered by the inventory management system, which can be part of the CMS 128 or a separate application that is in communication with the CMS 128.

Figure 2:
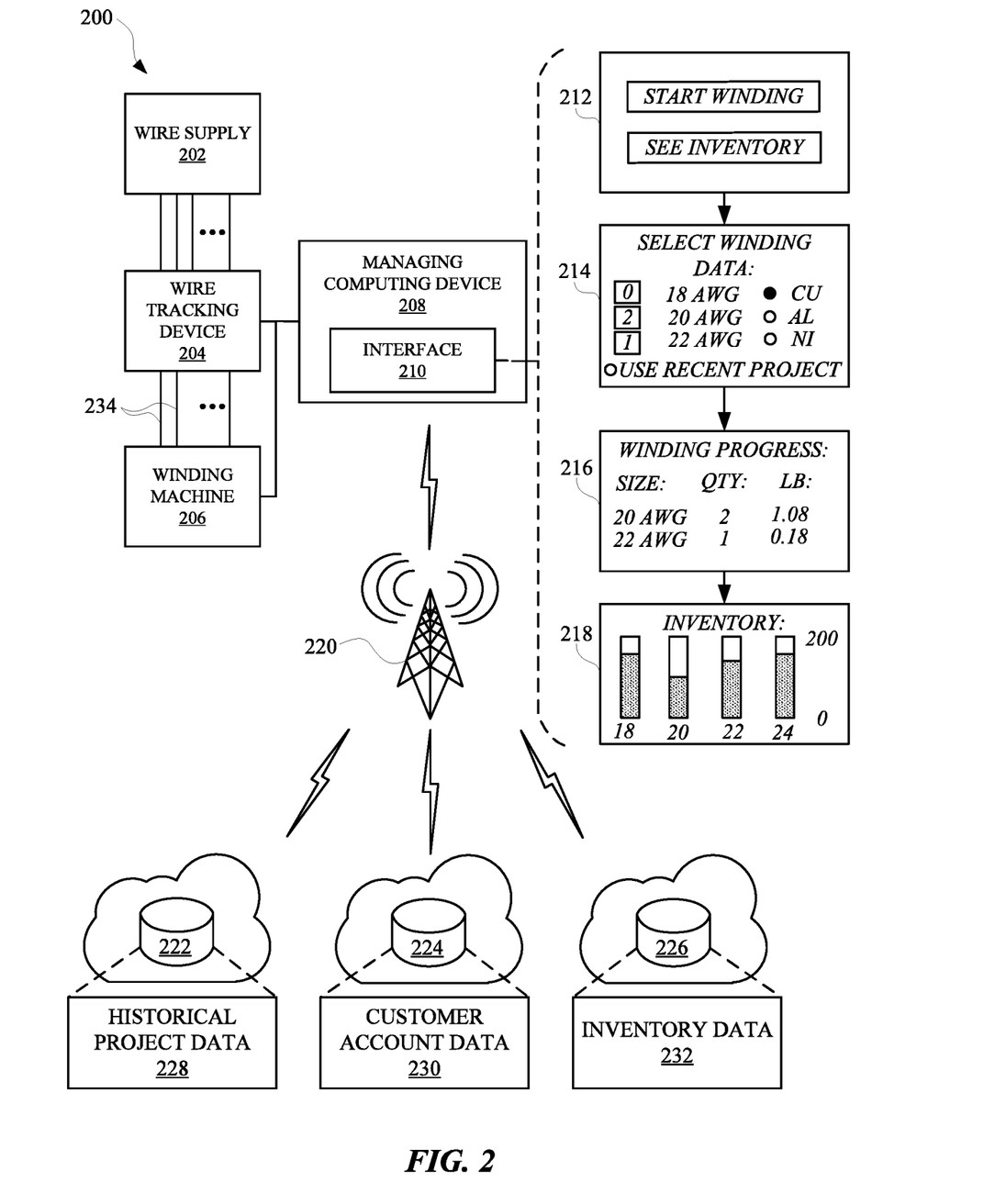
FIG. 2 illustrates a system for tracking and using wiring supply data during a winding operation performed by a winding machine.

FIG. 2 illustrates a system 200 for tracking and using wiring supply data during a winding operation performed by a winding machine 206. The system 200 can include a wire supply 202 that provides wires 234 to a winding machine 206. The wire supply 202 can include one or more pails, bundles, or other containers of wire that can be unraveled by the winding machine 206 during a winding operation. Each wire container of the wire supply 202 can include a different type of wire, such as, for example, a different material, size, shape, resistance, specific gravity, or other property of wire. As the wires 234 are being provided to the winding machine 206 during a winding operation, a wire tracking device 204 of the system 200 can provide a signal that indicates how much wire is being provided from the wire supply 202. The wire tracking device 204 can be an electromechanical device that is responsive to the motion of the wires 234 as the wires 234 move by the wire tracking device 204.

In some implementations, the wire tracking device 204 can include one or more pulleys that are attached to one or more tachometers that can each provide a signal in response to a pulley being rotated by the motion of the wires 234. In other implementations, the wire tracking device 204 can include one or more sensors capable of providing signals in response to the motion of the wires 234 moving near the sensors. The signals provided by the sensors can indicate a length of the wires 234 being supplied from the wire supply 202. In some implementations, the signals from the sensors can indicate the type of wires 234 being supplied from the wire supply 202. For example, the sensors can include optical sensors that can provide signals from which size, shape, and material of each wire 234 can be determined. In some implementations, the wire tracking device 204 can be multiple different wire tracking devices (e.g., pulleys and sensors) that can be connected at different locations of the system 200.

The wire tracking device 204 can provide the signals to a managing computing device 208. The managing computing device 208 can control the winding machine 206 to perform various winding operations. During a winding operation, the managing computing device 208 can receive the signals from the wire tracking device 204 as feedback and provide instructions to the winding machine 206 based on the feedback. For example, the wire tracking device 204 can indicate an amount of each wire 234 that has being used for a particular winding operation. When the amount of each wire 234 reaches a limit assigned to a particular winding operation, the managing computing device 208 can instruct the winding machine 206 to complete or stop the winding operation. In some implementations, the wire tracking device 204 can provide signals to the managing computing device 208 indicating the types of wires 234 being used on a particular winding operation. If the types of wires 234 do not correspond to the types of wires specified by an operator, the managing computing device 208 can instruct the winding machine 206 to pause or stop the winding operation in order that the wires 234 can be swapped for the correct wire types.

An operator can specify types of wires to be supplied for a winding operation via an interface 210 of the managing computing device 208. The interface 210 can be a touchscreen display or other interface capable of allowing a user to control the managing computing device 208 through gestures and/or actions. The interface 210 can display multiple different graphical user interfaces for the operator to interact with in order control and/or monitor a winding operation, as well as an inventory of wires. For example, the managing computing device 208 can provide a starting interface 212 where the operator can be provided options to either start a winding operation (e.g., by pressing the "Start Winding" button) or displaying an inventory interface 218 (e.g., by pressing the "See Inventory" button). If the operator selects to start a winding operation, the interface 210 can transition to displaying a specification interface 214. Furthermore, in response to the operator selecting to start the winding operation, the computing device 208 can transmit a signal to the winding machine 116 and cause the winding machine 116 to initialize the winding operation (e.g., start winding one or more different types of wires around a winding head).

The specification interface 214 can provide various options for the operator to identify the specifications for a winding operation. In some implementations, the managing computing device 208 can access a server 226 that stores inventory data 232. The managing computing device 208 can update the inventory data 232 using information derived from signals generated by the wire tracking device 204. The updated inventory data 232 can be used by the managing computing device 208 to present the operator with selections for types of wires 234 available at the wire supply 202. For example, the managing computing device 208 can determine that 18 AWG, 20 AWG, and 22 AWG wires made of copper (CU), aluminum (AL), and nickel (NI) are available for winding operations. Based on this determination, the managing computing device 208 can present buttons and/or other selectable elements at the specification interface 214 for selecting the available wires for a winding operation.

In some implementations, the managing computing device 208 can present the operator with the option of using historical project data for a winding operation (e.g., by selecting the button labeled "Use recent project" at the specification interface 214). In response to selecting the "recent project" button, the managing computing device 208 can access a server 222 that stores historical project data 228. The historical project data 228 can include information corresponding to previous winding operations that have been performed by the winding machine 206. The information can identify specifications of the previous winding operations such as, for example, the types of wires used for the previous winding operations. If the operator selects a previous winding operation at the interface 210, the managing computing device 208 can load the specifications for the previous winding operation into a current winding operation. In other implementations, in response to selecting the "recent project" button, the managing computing device 208 can access a server 224 that stores customer account data 230. The specifications for an order from a customer can be provided in the customer account data 230 and loaded into the managing computing device 208. In this way, the operator can select the type of order in the customer account data 230 without having to manually input each type of wire required for the order.

The managing computing device 208 can begin the winding operation after receiving the specifications from the operator or other sources for specifications. During the winding operation, the interface can provide a progress interface 216, which can display how much of each type of wire has been used during the winding operation. For example, during a winding operation that is using 2 strands (i.e., quantity of 2) of 20 gauge wire (i.e., 20 AWG) and one strand of 22 gauge wire, the progress interface 216 can identify each gauge of wire. The progress interface 216 can also identify how much of each gauge of wire has been used so far during the winding operation (e.g., 1.08 pounds (LB) of 20 AWG wire, and 0.18 pounds (LB) of 22 AWG wire). In this way, the operator is able to visualize how much wire is being used at any given time.

The information provided at the progress interface 216 can be based on information from the wire tracking device 204, the winding machine 206, the wire supply 202, and/or the managing computing device 208. For example, initially when the winding data is specified at the specification interface 214, the managing computing device 208 can determine how much of each selected type of wire (e.g., copper, 20 AWG, and 22 AWG) is already extending from the wire supply 202. Wires 234 can be pre-existing between the wire supply 202 and the winding machine 206 after a winding operation is completed. The pre-existing wires can extend between the wire supply 202 and the wire tracking device 204, the wire supply 202 and a tensioner, the tensioner and the winding machine 206, and/or the wire tracking device 204 and the winding machine 206. The wire tracking device 204 and/or the managing computing device 208 can identify these pre-existing wires and use them to determine how much wire is being used for a particular winding operation.

In order to determine how much pre-existing wire is being used for a winding operation, the managing computing device 208 can determine a length of the pre-existing wire based on certain dimensions. For example, a length between the wire supply 202 and the winding machine 206 can be used to determine a length and/or weight of 20 AWG copper wire that is extending between the wire supply 202 and the winding machine 206. Alternatively, a length between the wire supply 202 and the tensioner can be used to determine a length and/or weight of 18 AWG aluminum wire that is extending between the tensioner and the winding machine 206. The wire tracking device 204 can be used to identify one or more wires that are pre-existing during the initialization of a winding operation. In this way, all materials used during a winding operation can be accounted for, in order that the inventory data 232 can be more accurate and the customers can be billed according to more accurate values of wire consumption.

In some implementations, the wire supply 202 can include wire containers that are each individually weighed by scales that communicate with the managing computing device 208. In this way, the managing computing device 208 can update the inventory data 232 in real-time according to how the weight of each wire container changes from the beginning of a winding operation to the end of the winding operation. In other implementations, a core that is being wound with the wires 234 can be weighed by a scale of the winding machine 206 before and after the winding operation. The difference in weight of the core before and after the winding operation can be used in combination with the signals from the wire tracking device 204 and/or specifications of the winding operation to determine amount of each wire type used for winding the core.

When a winding operation has been completed by the winding machine 206, the managing computing device 208 can provide data over a network 220 to update various databases associated with the winding operation. For example, a total weight or length of wires (including the pre-existing wires) can be calculated for the completed winding operation. The total amount of wires can be used to calculate a price for the winding operation and the customer account data 230 can be updated to include a bill for the price of the total amount of wires. Additionally, the historical project data 228 project data can be updated to include one or more entries identifying the completed winding operation and the specifications (e.g., wire types, wire amounts used, cost of winding operation, duration of winding operation, etc.) associated with the winding operation. In some implementations, the inventory data 232 can be updated when a winding operation is complete in order to reflect an amount of wire used during the winding operation. When one or more of the types of wire reaches a threshold amount of wire, the managing computing device 208 can initialize an order for more wire. Orders can be initialized during or after a winding operation, in order that the wire supply 202 will not remain low for any extended period of time. For example, if during a winding operation, the 20 AWG copper wire reaches a threshold amount (e.g., less than 2 pounds or any other suitable metric value) at the wire supply 202, the managing computing device 208 can initialize an order for more 20 AWG copper wire during the winding operation.

Figure 3:
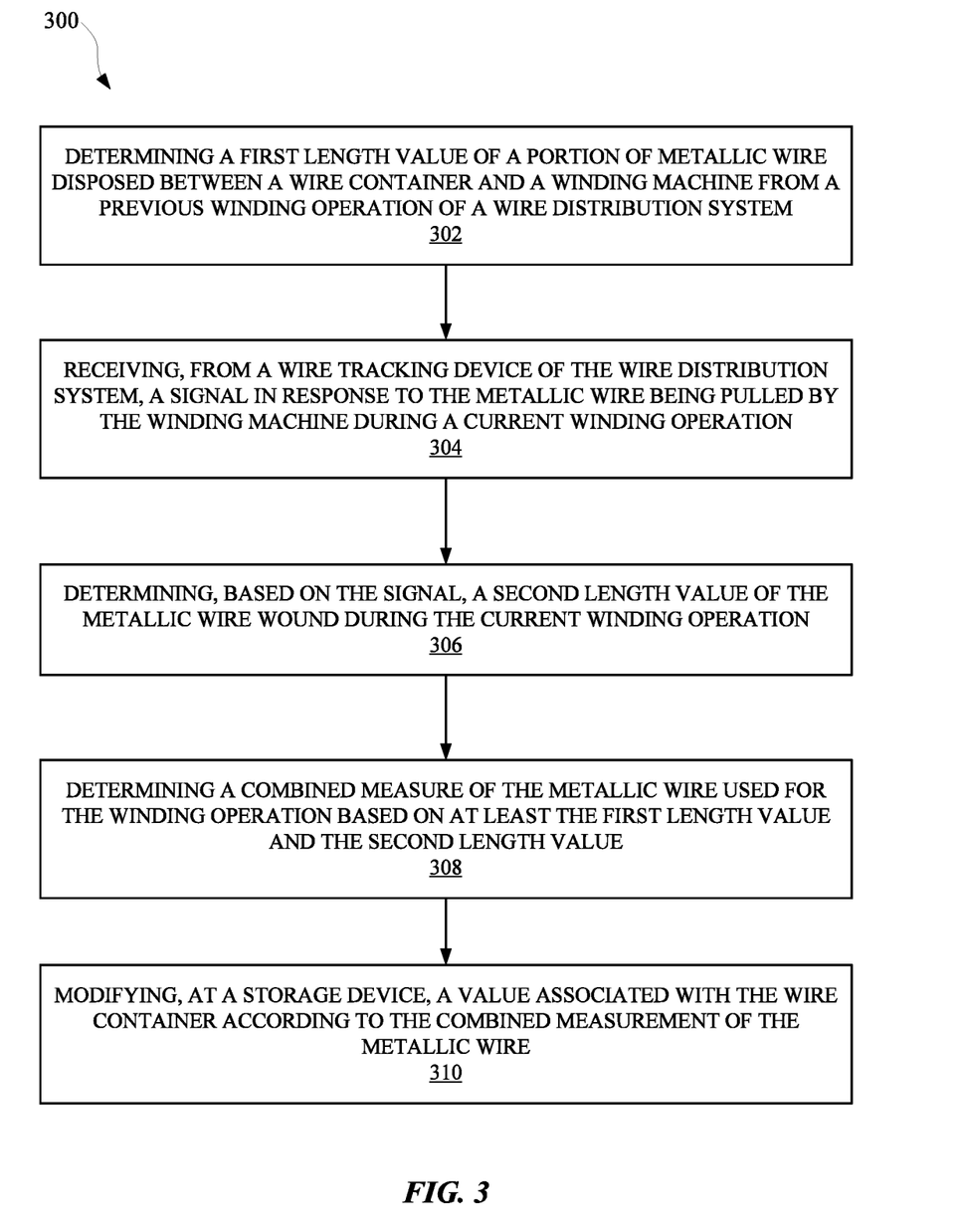
FIG. 3 illustrates a method for determining an amount of wire used in a winding operation based on a pre-existing amount of wire in a wire distribution system and a measured amount of wire used during the winding operation.

FIG. 3 illustrates a method 300 for determining an amount of wire used in a winding operation based on a pre-existing amount of wire in a wire distribution system and an amount of wire wound about a winding head/form during a winding operation of the wire distribution system. The method 300 can be performed by a computing device, a controller, and/or any other apparatus capable of calculating wire length. The method 300 can include a block 302 of determining a first length value of a portion of metallic wire, disposed between a wire container and a winding machine, from a previous winding operation of a wire distribution system. The wire distribution system can operate to wind multiple different types of windings such as, for example, a rotor or armature for an electric motor. The wires can be supplied from wire containers and each wire container can correspond to a different type of wire (e.g., a wire of a different gauge, shape, weight, material, etc.). After a winding operation is complete, some metallic wire can be left disposed between the wire container and the winding machine. For example, metallic wire can be left as pre-existing wire between the wire container and a tensioner, the tensioner and the winding machine, a wire tracking device and the winding machine, and/or any other location of the wire distribution system. The determination can be made by a computing device that can receive signals from the wire tracking device indicating a location, length, and/or other feature of one or more wires for determining how much pre-existing wire is left at the wire distribution system.

At block 304, a signal can be received from the wire tracking device in response to the winding machine and/or tensioner pulling the metallic wire during a current winding operation. The signal can indicate that the amount of metallic wire that has been used during the current winding operation. For example, the wire tracking device can track an amount of one or more types of metallic wire that are being used for the current winding operation using a device, such as a sensor (e.g., a tachometer, a camera, a rotary encoder, and/or any other device capable of measuring an amount of wire). In some implementations, the wire tracking device can include one or more tachomometers that can provide signals in response to the metallic wires moving passed the wire tracking device. In other implementations, the wire tracking device can include one or more sensors that can provide signals in response to the metallic wire moving passed the sensors. For example, the sensors can be optical sensors that provide signals according to an amount of light that is reflected from the metallic wires. The signals can be used to determine the properties of the metallic wires such as quantity, size, length, gauge, material, and/or any other property of the metallic wires.

At block 306, a second length value for the metallic wire is determined based on the signal from the wire tracking device. The second length value can correspond to an amount of wire that is used for a winding during the current winding operation. In some implementations, the second length value can exclude or include the first length value of the metallic wire. The second length value can be calculated by the computing device that is receiving the signals from the wire tracking device. For example, the computing device can determine a total time of the current winding operation and a speed of the metallic wire (e.g., provided by the wire tracking device) as the metallic wire travels by the wire tracking device. Using at least these two values, the computing device can determine the second length value for the metallic wire.

At block 308, a combined measure of the metallic wire used for the winding operation is determined based on at least the first length value and the second length value. In some implementations, the first length value and the second length value are summed in order to determine how much metallic wire was used during the winding operation. In other implementations, the first length value and the second length value are differenced in order to determine how much metallic wire was used during the winding operation. In some implementations, multiple first length values corresponding to different types of pre-existing wires in the wire distribution system can be combined with multiple second length values corresponding to different types of metallic wires used by the wire distribution system. In other words, combined measurements of wires for a winding operation can be used to determine a total amount of multiple types of wires used during the winding operation.

At block 310, a value associated with one or more wire containers can be modified at a storage device according to the combined measurement of the metallic wire. The storage device can be accessible to the wire distribution system and include data associated with various aspects of the wire distribution system. For example, the storage device can store inventory data, and the inventory data can be updated to reflect the amount of metallic wire that was used during the winding operation. The inventory data can be updated in real-time during the winding operation, in order that the operator can determine how much of each metallic wire is available. In some implementations, the inventory data can be used by the computing device to provide notifications to the operator when inventory of a particular metallic wire has fallen to a threshold amount of metallic wire. In this way, the operator will know not to initialize subsequent jobs with the particular wire until more wire has been supplied to the inventory. In other implementations, a wire distribution system can present an error to the operator when the operator is attempting to initialize a winding operation but inventory of a particular wire is within a particular threshold. For example, the wire distribution system can estimate the amount of wire needed for a winding operation and compare the estimated amount to the amount in inventory. If the estimated amount is more than the amount in inventory, or within a threshold of the amount in inventory, the winding operation can be paused by the wire distribution system and an error message can be presented to the operator.

Figure 4:
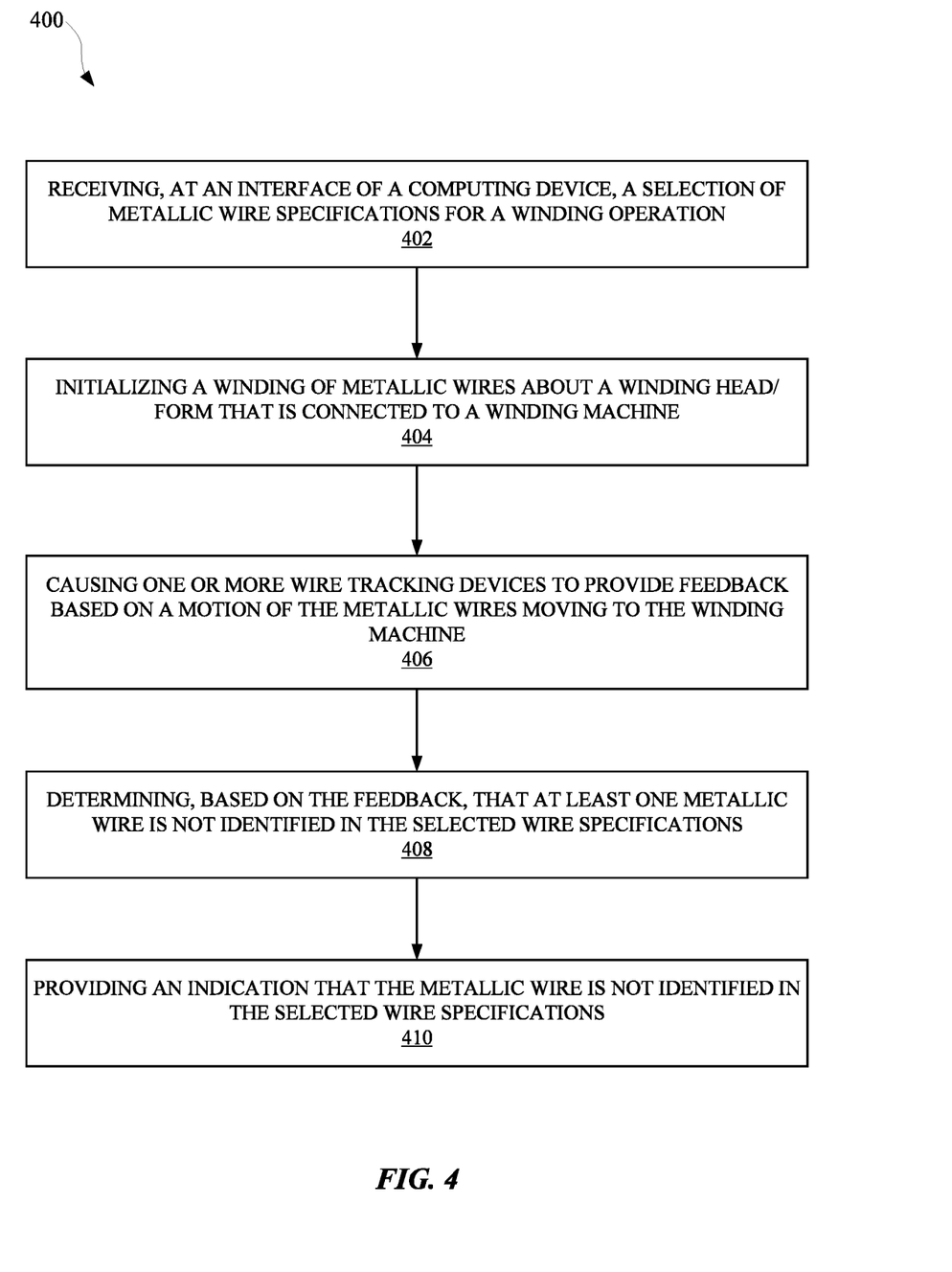
FIG. 4 illustrates a method for error checking winding operations to ensure that correct types of metallic wires are used for each winding operation.

FIG. 4 illustrates a method 400 for error checking winding operations to ensure that correct types of metallic wires are used for each winding operation. The method 400 can be performed by a computing device, a controller, and/or any other apparatus capable of managing wire data. The method 400 can include a block 402 of receiving, at an interface of a computing device, a selection of metallic wire specifications for a winding operation. The computing device can be part of a wire distribution system that can automatically wind metallic wire using multiple different types of wire. The interface of the computing device can present an operator with options for types of wires to use for a winding operation. The interface can present inventory data that identifies how much of each type of wire is available for the winding operation. Furthermore, the interface can present the operator with options for repeating previous winding operations, or selecting a group of wire types that are associated with an order. The selected specifications can include quantities of wires, material types, gauges, lengths, resistivities, conductivities, and/or any other properties of wires.

At block 404, a winding of metallic wires about a winding head/form can be initialized. The winding head/form can be connected to a winding machine that is part of the wire distribution system. The winding head/form can be used, for example, to create a winding for an electronic device such as a motor or transformer, and the metallic wires can be conductive wires that have a non-conductive coating for creating electromagnetic coils. When the winding operation is initialized, a tensioner and/or winding machine can extract one or more types of wires from a wire supply of the wire distribution system.

At block 406, one or more wire tracking devices can be caused to provide feedback based on a motion of the metallic wires moving to the winding machine. The wire tracking devices can provide feedback in the form of signals that are transmitted from the wire tracking devices to a computing device of the wire distribution system. The wire tracking devices can provide signals that indicate an amount of wire that has passed by each wire tracking device, and therefore the signals can be used to determine a total amount of wire used during a winding operation. Furthermore, the signals from the wire tracking devices can be used to determine the types of wires used during the winding operation (e.g., 18 AWG copper wire, 20 AWG copper wire, and 22 AWG alloy wire).

At block 408, at least one metallic wire can be identified, based on the feedback, as being not part of the selected wire specifications. In other words, the wire specifications selected by the operator do not identify at least one of the metallic wires that were detected by the wire tracking devices during the winding operation. Such an error can occur when an operator has incorrectly attached the metallic wires to the winding machine and/or the tensioner, thereby causing the wrong wires to enter the winding machine. This can result in malfunctioning of the electronic device, in which the winding is intended to subsequently operate in, and generally waste materials.

At block 410, the computing device can provide an indication that metallic wire is not identified in the selected wire specifications. The indication can be provided in one or more different mediums. For example, the indication can be provided at an interface of the computing device, thereby putting the operator on notice of the error. In some implementations, the indication can be provided by pausing or stopping the winding operation. In other words, when the computing device determines that at least one metallic wire is not identified in the selected wire specifications, the computing device can cause the winding machine to stop the winding operation. In this way, the winding machine will be stopped immediately upon the error being detected, rather than waiting for the operator to discover the error, thereby mitigating material waste.

Figure 5:
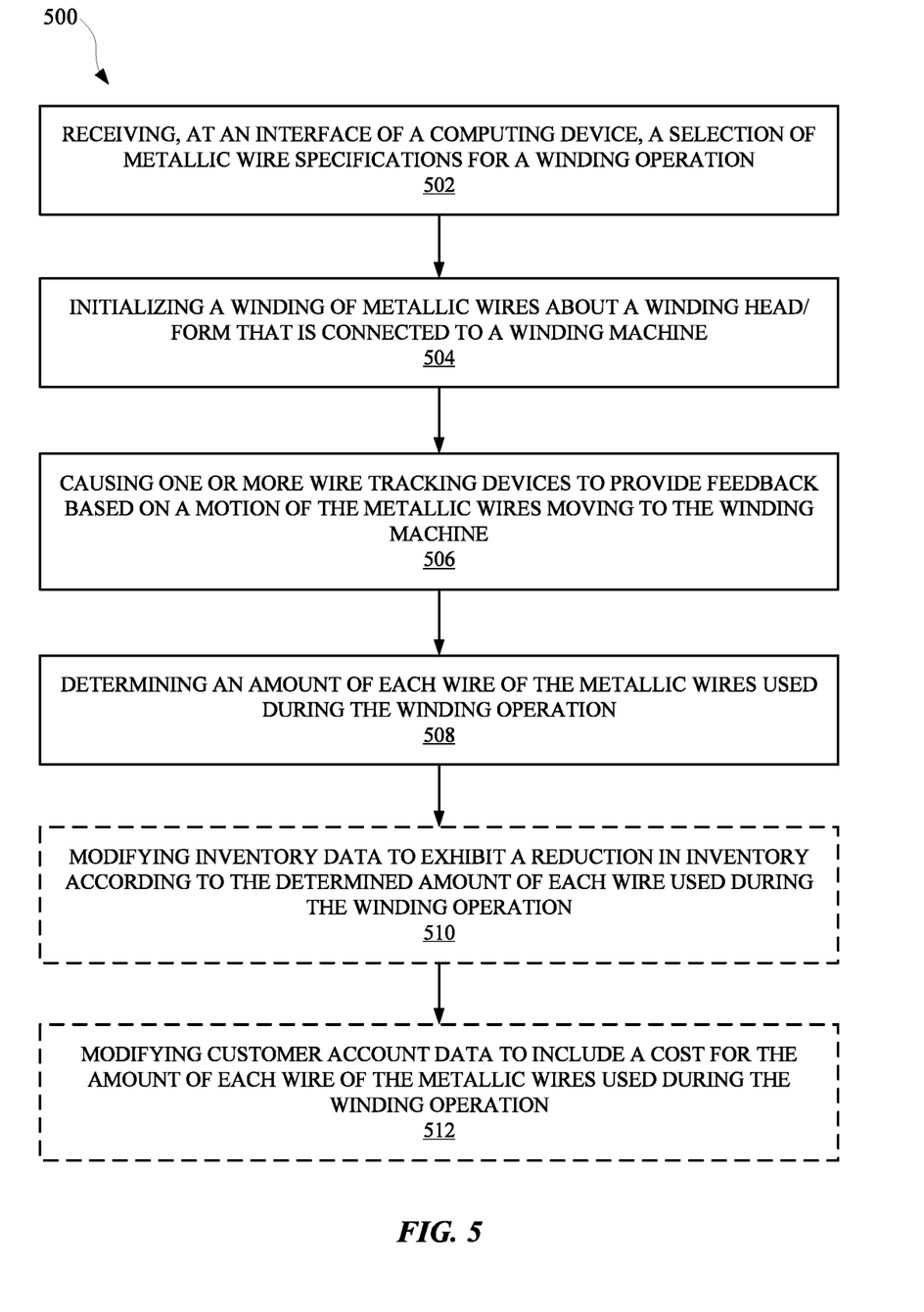
FIG. 5 illustrates a method for tracking amounts of wires that are used during a winding operation.

FIG. 5 illustrates a method 500 for tracking amounts of wires that are used during a winding operation by a wire distribution system. The method 500 can be performed by a computing device, a controller, and/or any other apparatus capable of calculating wire length. The method 500 can include a block 502 of receiving, at an interface of a computing device, a selection of metallic wire specifications for a winding operation. The computing device can be in communication with a wire distribution system and one or more storage devices that store data associated with winding operations of the wire distribution system. In some implementations, the selection of the metallic wire specifications can include a selection of a previous winding operation (e.g., "Winding Operation for 'Company X'") that is associated with previously employed wire specifications. In this way, an operator of the computing device does not necessarily have to input each wire specification manually when winding operations are duplicative.

At block 504, a winding of metallic wires can be initialized. The winding can be connecting to a winding machine of the wire distribution system, and a winding head/form of the winding machine can direct the flow of the metallic wires. As the metallic wires are wound, the supply of the metallic wires can be depleted from their respective wire containers. Such depletion can be tracked in order that inventory data can be accurate and customer accounts can be billed according to the amount of wires used on their corresponding orders (e.g., orders for one or more windings).

At block 506, one or more wire tracking devices of the wire distribution system can provide feedback based on a motion of the metallic wires moving to the winding machine. The feedback can be a signal that is provided to the computing device in response to at least one metallic wire moving near or against a wire tracking device. The wire tracking devices can be connected at one or more locations within the wire distribution system for detecting and/or identifying wires that are moving through the wire distribution system. For example, one or more wire tracking devices can be connected to a tensioner or a winding machine of the wire distribution system in order to identify features of the wires moving through the wire distribution system.

At block 508, an amount of each wire of the metallic wires used during the winding operation is determined. The amount of each wire can be determined using the feedback from the wire tracking devices. For example, the feedback can include one or time-varying current signals that can be processed by a computing device of the wire distribution system to determine amounts of wire provided to a winding. The amounts of wire can be determined simultaneously to a winding operation and/or in response to a completion of the winding operation.

At block 510, inventory data can optionally be modified to exhibit a reduction in inventory according to the determined amount of each wire used for a particular winding. For example, based on the feedback, the computing device can determine that 1.08 pounds of 18 AWG copper wire was used during a winding operation. Additionally, based on the feedback, the computing device can determine that 1.45 pounds of 20 AWG copper wire was also used during the winding operation. The computing device can access a remote storage device for managing the inventory data that is associated with the 18 AWG copper wire and the 20 AWG copper wire. The determined value of 1.08 pounds can be subtracted from a current inventory value (e.g., 10 pounds) corresponding to the 18 AWG copper wire in the inventory data. The determined value of 1.45 pounds can be subtracted from a current inventory value (e.g., 12 pounds) corresponding to the 20 AWG copper wire in the inventory data. In this way, inventory data can be automatically updated during and after winding operations are complete without requiring manual entry from an operator.

At block 512, account data can be optionally modified to include a cost for the amount of each wire of the metallic wires used during the winding operation. For example, the computing device can determine that 1.08 pounds of 18 AWG copper costs $15 and 1.45 pounds of 20 AWG wire costs $20. The computing device can communicate these costs to a remote device that stores account data for billing customers and taking orders from customers. The account data can be updated with information from the computing device regarding costs of the winding for a customer. The account data be modified to include entries for the $15 of 18 AWG wire and $20 of the 20 AWG wire. The customer can then be automatically notified of the completion of the winding operation along with the costs for the winding operation.

Figure 6:
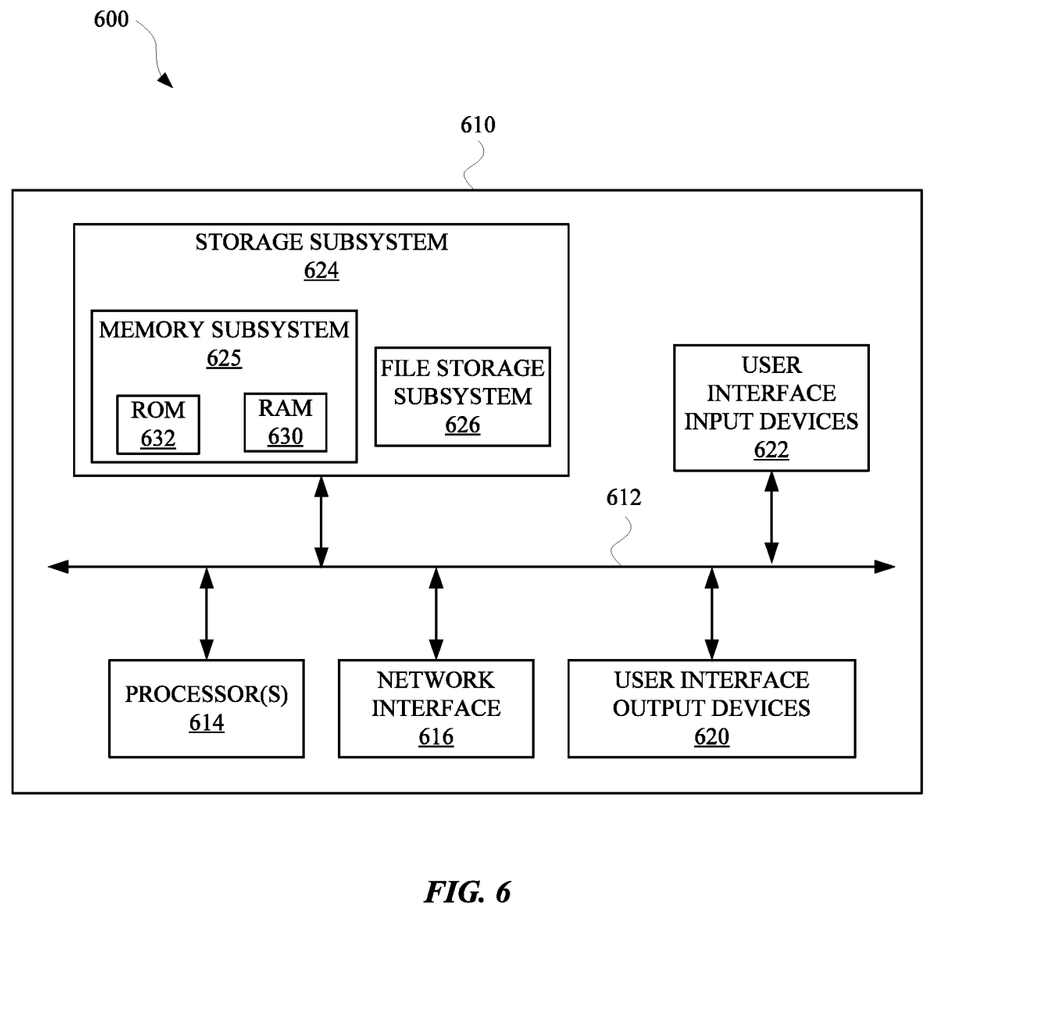
FIG. 6 is a block diagram of an example computer system.

FIG. 6 is a block diagram of an example computer system 610 or computing device. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 300, 400, and/or 500, and/or to implement one or more of the managing computing device 208, the wire tracking device 204, and/or any other device discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   determining a first length value of a portion of a metallic wire, the portion of the metallic wire located between a wire container, for dispensing the metallic wire in a wire distribution system, and a winding head of a winding machine creating a winding, wherein the portion of the metallic wire is previously extracted from the wire container as a result of being pulled from the wire container during winding of a previous winding wound by the winding machine;
   receiving, from a wire tracking device of the wire distribution system, a signal in response to the metallic wire being pulled by the winding machine when creating the winding, the wire tracking device providing the signal based on the metallic wire moving within a responsive distance of the wire tracking device;
   determining, based on the signal, a second length value of the metallic wire, wherein the second length value of the metallic wire corresponds to an amount of wire used by the winding machine to create the winding;
   determining a combined measure of the metallic wire used by the winding machine to create the winding, wherein determining the combined measure of the metallic wire is based on both the first length value and the second length value; and
   modifying, at a storage device storing data related to the wire distribution system, a stored value associated with the at least one wire container dispensing the metallic wire, wherein the stored value is modified according to the determined combined measure of the metallic wire.

2. The method of claim 1, wherein the winding machine is operable to wind the metallic wire to create the winding for an electronic device.

3. The method of claim 1, wherein the wire distribution system includes a wire tensioner that is operable to apply an amount of tension on the wire tensioner, and the wire tracking device is attached to the tensioner.

4. The method of claim 1, wherein the wire tracking device includes a pulley that is connected to the winding machine.

5. The method of claim 1, wherein the data stored by the storage device includes additional values associated with different wire containers that are in addition to the wire container, the different wire containers including at least a first different wire container that dispenses a different metallic wire that is of a different type than the metallic wire dispensed by the wire container.

6. The method of claim 1, wherein the signal is received from the wire tracking device simultaneous to the winding of the metallic wire.

7. The method of claim 1, wherein the wire tracking device includes one or more sensors operable to provide the signal in response to the metallic wire being pulled by the winding machine.

8. A method implemented by one or more processors, the method comprising:
   receiving, at an interface of a computing device, a selection of metallic wire specifications for a winding operation to be performed by a wire distribution system, the wire distribution system comprising wire containers for simultaneously providing different types of metallic wires for the winding operation;
   causing the winding operation to initialize, wherein the winding operation includes winding the different types of metallic wires about a winding head that is connected to a winding machine that receives the different types of metallic wires from the wire containers;
   causing one or more wire tracking devices of the wire distribution system to provide feedback based on a motion of the different types of metallic wires through the wire distribution system during the winding operation;
   determining, based on the feedback, that at least one metallic wire, of the different types of metallic wires, is not identified in the metallic wire specifications selected at the interface of the computing device; and
   providing an indication that the at least one metallic wire is not identified in the metallic wire specifications.

9. The method of claim 8, further comprising:
   identifying, based on the feedback, one or more types of the different types of metallic wires moving through the wire distribution system during the winding operation.

10. The method of claim 9, wherein determining that at least one metallic wire is not identified in the wire specifications includes:
    comparing the one or more identified types to the wire specifications selected at the interface of the computing device.

11. The method of claim 8, wherein a first metallic wire of the different types of metallic wires corresponds to a gauge that is different than a second metallic wire of the different types of metallic wires.

12. The method of claim 8, further comprising:
    accessing a storage device that stores wire-availability data associated with each of the wire containers; and
    causing the interface to display at least a portion of the wire-availability data.

13. A method implemented by one or more processors, the method comprising:
    receiving, at an interface of a computing device, a selection of metallic wire specifications for a winding operation to be performed by a wire distribution system, the wire distribution system comprising wire containers for simultaneously providing different types of metallic wires for the winding operation;
    causing the winding operation to initialize, wherein the winding operation includes winding the different types of metallic wires about a winding head that is connected to a winding machine that receives the different types of metallic wires from the wire containers;
    causing one or more wire tracking devices of the wire distribution system to provide feedback based on a motion of the metallic wires through the wire distribution system during the winding operation;

determining, based on the feedback, an amount of each wire of the metallic wires used during the winding operation;

modifying wire-related data to exhibit a reduction in available metallic wires according to the determined amount of each metallic wire of the metallic wires used during the winding operation; and modifying wire-related data to include a value for the metallic wires used during the winding operation.

14. The method of claim 13, wherein the metallic wire specifications correspond to a previous winding operation performed by the wire distribution system.

15. The method of claim 14, wherein the computing device is configured to access historical project data and cause the interface to display metallic wire specifications associated with previous winding operations.

16. The method of claim 13, wherein modifying the customer account data includes:

determining a value per unit for each metallic wire of the metallic wires used during the winding operation.

17. The method of claim 13, wherein the wire distribution system includes multiple wire tracking devices, and each wire tracking device is configured to monitor a metallic wire of the different types of metallic wires.

18. The method of claim 13, wherein determining the amount of each wire of the metallic wires used during the winding operation is further based on an amount of pre-existing wire in the wire distribution system from a previous winding operation.

19. The method of claim 13, wherein the different types of metallic wires include different materials of wire.

20. The method of claim 13, wherein the one or more tracking devices are attached to the winding machine.

* * * * *